(12) United States Patent
Sakakibara et al.

(10) Patent No.: US 9,902,826 B2
(45) Date of Patent: Feb. 27, 2018

(54) TRANSPARENT LAYERED FILM, PROCESS FOR PRODUCING SAME, AND ELECTRODE FOR TOUCH PANEL

(71) Applicant: Daicel Corporation, Osaka-shi, Osaka (JP)

(72) Inventors: Takahiro Sakakibara, Amagasaki (JP); Hiroaki Ushida, Amagasaki (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/300,905

(22) PCT Filed: Feb. 26, 2015

(86) PCT No.: PCT/JP2015/055646
§ 371 (c)(1),
(2) Date: Sep. 30, 2016

(87) PCT Pub. No.: WO2015/151672
PCT Pub. Date: Oct. 8, 2015

(65) Prior Publication Data
US 2017/0022343 A1 Jan. 26, 2017

(30) Foreign Application Priority Data
Apr. 2, 2014 (JP) ................................. 2014-076150

(51) Int. Cl.
| | |
|---|---|
| *G06F 3/045* | (2006.01) |
| *C08J 7/18* | (2006.01) |
| *C08J 7/04* | (2006.01) |
| *C09D 133/08* | (2006.01) |
| *B32B 17/06* | (2006.01) |
| *B32B 7/12* | (2006.01) |
| *C03C 17/245* | (2006.01) |
| *C09D 4/00* | (2006.01) |
| *C09D 5/00* | (2006.01) |
| *C09D 7/06* | (2006.01) |
| *C09D 7/12* | (2006.01) |
| *G06F 3/044* | (2006.01) |

(52) U.S. Cl.
CPC *C08J 7/18* (2013.01); *B32B 7/12* (2013.01); *B32B 17/064* (2013.01); *C03C 17/245* (2013.01); *C08J 7/042* (2013.01); *C08J 7/047* (2013.01); *C09D 4/00* (2013.01); *C09D 5/00* (2013.01); *C09D 7/06* (2013.01); *C09D 7/1216* (2013.01); *C09D 7/1266* (2013.01); *C09D 133/08* (2013.01); *G06F 3/044* (2013.01); *B32B 2255/20* (2013.01); *B32B 2307/202* (2013.01); *B32B 2307/412* (2013.01); *B32B 2307/538* (2013.01); *B32B 2457/208* (2013.01); *C03C 2217/21* (2013.01); *C03C 2217/94* (2013.01); *C08J 2367/02* (2013.01); *C08J 2401/14* (2013.01); *C08J 2433/08* (2013.01); *C08J 2435/02* (2013.01); *G06F 3/045* (2013.01); *G06F 2203/04103* (2013.01)

(58) Field of Classification Search
CPC .... C08J 7/18; C08J 7/042; C08J 7/047; B32B 7/12; B32B 17/064; B32B 17/245; C09D 4/00; C09D 7/1216; C09D 7/1266; C09D 133/08; G06F 3/044
See application file for complete search history.

(56) References Cited

U.S. PATENT DOCUMENTS

| | | | | |
|---|---|---|---|---|
| 4,980,210 A | * | 12/1990 | Heyes .................. | B21D 51/383 156/321 |
| 6,171,663 B1 | * | 1/2001 | Hanada ................ | C09D 183/04 349/139 |
| 6,689,458 B1 | * | 2/2004 | Mikoshiba .............. | B32B 27/06 428/156 |

(Continued)

FOREIGN PATENT DOCUMENTS

| | | |
|---|---|---|
| JP | 2004-42653 A | 2/2004 |
| JP | 5170635 B2 | 3/2013 |

(Continued)

OTHER PUBLICATIONS

International Search Report, issued in PCT/JP2015/055646, PCT/ISA/210, dated Apr. 21, 2015.

(Continued)

*Primary Examiner* — Ariel Balaoing
(74) *Attorney, Agent, or Firm* — Birch, Stewart, Kolasch & Birch, LLP

(57) ABSTRACT

A transparent layered film is produced by forming an anti-water-mark layer on a first side of a transparent resin layer and forming an uneven structure on a surface of the anti-water-mark layer, wherein the anti-water-mark layer comprises a cured product of a curable composition containing a curable resin, a thermoplastic resin, and a metal oxide particle having an average primary particle size of 1 to 100 nm, and the uneven structure has a roughness average Ra of not less than 0.005 and less than 0.03 μm, a mean spacing of profile irregularities Sm of 50 to 300 μm, an average absolute slope Δa of less than 0.1°, and a ten-point average roughness Rz of less than 0.2 μm. Lamination of the film on a glass-containing upper electrode of a touch screen display prevents scattering of glass fragments produced by breakage of the upper electrode, occurrence of water marks, and sparkling on a high-definition display provided with the film.

12 Claims, No Drawings

(56) References Cited

U.S. PATENT DOCUMENTS

| | | | |
|---|---|---|---|
| 2004/0247837 A1* | 12/2004 | Enlow | B32B 27/00 428/195.1 |
| 2008/0218865 A1 | 9/2008 | Iwata et al. | |
| 2010/0260986 A1* | 10/2010 | Ito | G06F 3/045 428/212 |
| 2012/0301676 A1 | 11/2012 | Ushida et al. | |
| 2015/0015812 A1 | 1/2015 | Takakusagi et al. | |
| 2015/0323961 A1* | 11/2015 | Leonhard | G06F 1/1637 428/38 |

FOREIGN PATENT DOCUMENTS

| | | |
|---|---|---|
| JP | 2014-2520 A | 1/2014 |
| WO | WO 2011/108394 A1 | 9/2011 |
| WO | WO 2013/060683 A1 | 5/2013 |
| WO | WO 2013/111672 A1 | 8/2013 |

OTHER PUBLICATIONS

Written Opinion of the International Searching Authority, issued in PCT/JP2015/055646, PCT/ISA/237, dated Apr. 21, 2015.

International Preliminary Report and Written Opinion of the International Searching Authority (Forms PCT/IB/336, PCT/IB/373 and PCT/ISA/237), dated Oct. 13, 2016, for International Application No. PCT/JP2015/055646, together with an English translation thereof.

* cited by examiner

TRANSPARENT LAYERED FILM, PROCESS FOR PRODUCING SAME, AND ELECTRODE FOR TOUCH PANEL

TECHNICAL FIELD

The present invention relates to a transparent layered film for being disposed inside a glass-containing upper electrode (a viewing-side transparent electrode) of a touch screen display in order to prevent the scattering of glass fragments produced by breakage of the electrode, a process for producing the film, and an electrode for a touch screen (or a touch panel).

BACKGROUND ART

A progress in an electronic display as man machine interface has resulted in popularization of an interactive input system. Among others, an apparatus having a touch screen (a digitizer) and an associated display is widely used in various fields such as an ATM (automated teller machine), a merchandise management, an outworking (canvassing, selling), a guide sign, and an entertainment device. Use of the touch screen in combination with a lightweight and thin display (e.g., a liquid crystal display) dispenses with any keyboard and exhibits the features of the display, and thus such a touch screen display is increasingly used for mobile devices. The touch screen display is a device for inputting (or feeding) information or instructions to a computer by touching a prescribed area on a touch screen (or a touch sensitive panel) with an input means such as a finger or a pen (a digital pen or a stylus). According to the position detection method, the touch screen display can be classified into an optical system, an ultrasonic-wave system, a capacitive system, a resistive system, and other systems.

Among these systems, the capacitive system detects the location of the touch using a change in capacitance. In light of excellent functionality, a projected capacitive touch screen display of indium oxide-tin oxide-series compound oxide (ITO) grid system is now being used for mobile devices and is receiving a lot of attention. The mobile devices include a smartphone, a mobile phone, an electronic paper, a tablet personal computer (PC), a pen tablet (or a graphics tablet), and a game console. In particular, for a device such as the smartphone or the tablet PC, a high-definition display is beginning to be widely used. The display for such a device also requires optical characteristics such as high transparency or anti-glareness. Moreover, the following are also developed: a high-resolution (4K) touch screen television having a pixel dimension (or pixel number) four times as large as that of a full high-definition television, and a high-resolution pen-input device that is used in the architectural field or the medical field. A transparent material is used for a display surface (an upper transparent electrode) of a touch screen display of such a device. As the transparent material, a glass material is widely used in terms of excellent transparency or heat resistance. The glass material, which is brittle, easily breaks due to falling or other causes, scattering into fragments. It is thus necessary to take measures to prevent the scattering of fragments (or pieces) of the glass material if the glass material breaks. A known method for preventing the scattering of fragments produced (or generated) by breakage of the upper electrode (cover glass) composed of the glass material includes pasting a hardly broken plastic film (a film for preventing scattering of glass fragments) to the inside (backside or inner layer) of the cover glass.

An anti-shatter film is usually a laminate composed of, in sequence, a pressure sensitive adhesive layer [such as an optical clear adhesive (OCA) film] for attaching the anti-shatter film to a cover glass, a transparent resin layer such as a poly(ethylene terephthalate) (PET) film, and a clear hard coat (CHC) layer for protecting the transparent resin layer from scratches in the process of production or commodity circulation. For example, for the capacitive touch screen of ITO grid system, in which an ITO (indium oxide-tin oxide-series compound oxide) film is laminated on the inside (backside or inner layer) of a cover glass disposed on the outermost side of the touch screen, the pressure sensitive adhesive layer of the anti-shatter film is attached to the ITO film, and the CHC layer is disposed toward a display device (a display unit) such as a liquid crystal display (LCD) or an organic electroluminescence (EL) display (OLED). In some cases the CHC layer and the display device are bonded together through a transparent pressure sensitive adhesive layer or other means. In light of productivity or others, a popularized method includes interposing an adhesive layer (a spacer) between the edge (periphery or outer frame) of the CHC layer and that of the display device to bond the edge of the CHC layer and that of the display device with a space (a space layer) between the hard coat layer and a liquid crystal layer of the display device. Unfortunately, for the capacitive touch screen of ITO grid system, which has such a space layer (a space), touching the display surface with a finger or a pen may keep the CHC layer adhering to the surface of the display device (e.g., a polarization layer in an LCD) and show blacking phenomenon (black spot). This phenomenon is referred to as water marks (WM). In order to prevent or reduce this phenomenon (WM production), for a conventional touch screen, a particle having a size of the order of micron is mixed to a hard coat layer to form an anti-water-mark (AWM) layer having an uneven structure with recesses and/or protrusions of the order of micron, and adhesion of the AWM layer to the surface of the display device is prevented. Along with a recent high-definition touch screen display, however, an anti-shatter film having a particle-containing AWM layer causes sparkling which reduces the visibility. In particular, higher protrusions of the uneven structure on the one hand achieve more improved AWM characteristics and on the other hand, easily cause sparkling. There is a trade-off relationship between the AWM characteristics and the optical characteristics.

As a functional layer for being disposed in a display device such as an LCD, a functional layer having an uneven structure on a surface thereof has been reported. Japanese Patent No. 5170635 (JP-5170635B, Patent Document 1) discloses a process for producing an optical laminate comprising a substrate having light transmittance and an anti-glare layer on the substrate, the process comprising forming an uneven shape having a mean spacing of profile irregularities (or an average spacing of unevenness or an average spacing of concavo-convexes) Sm of 100 to 600 μm, an average slope angle θa of 0.1 to 1.2°, and a ten-point average roughness Rz of more than 0.2 μm and not more than 1 μm on the anti-glare layer. According to the document, in order to achieve both prevention of sparkling and improvement of contrast for a high-definition display such as a cathode ray tube display (CRT) or an LCD, the optical laminate is disposed so that the uneven shape is located at the outermost side.

The document is, however, silent on a touch screen and is also silent on scattering of fragments of a broken glass substrate. Moreover, if the optical laminate is used as an anti-shatter film, sparkling would appear on a high-definition display provided with the optical laminate.

WO2011-108394 (Patent Document 2) discloses an optical film comprising a transparent film and a hard coat layer disposed on the transparent film, wherein the hard coat layer comprises a cured product of a curable resin precursor, a thermoplastic resin, and a metal oxide fine particle having an average primary particle size of 1 to 60 nm. The document discloses that an uneven structure having a roughness average (or an arithmetic average roughness) Ra of 0.03 to 0.15 µm and a mean spacing of profile irregularities Sm of 50 to 300 µm is formed on the surface of the hard coat layer. The document describes use of the optical film for a resistive touch screen for the purpose of improving anti-Newton-ring characteristics. In Examples of the document, a hard coat layer having a roughness average Ra of less than 0.03 µm has no anti-Newton-ring characteristics and is stated as a comparative example.

The document is also, however, silent on any relationship between the hard coat layer and the breakage of a glass material. Further, if the optical film is used as an anti-shatter film, sparkling would appear on a high-definition display provided with the optical film.

CITATION LIST

Patent Literature

Patent Document 1: JP-5170635B (Claim 1, and paragraphs [0006] and [0011])
Patent Document 2: WO2011-108394 (Claims 1 and 7, paragraphs [0005] and [0010], and Examples)

SUMMARY OF INVENTION

Technical Problem

It is therefore an object of the present invention to provide a transparent layered film which prevents or reduces the scattering of glass fragments produced by breakage of a glass-containing upper electrode of a touch screen display, the occurrence of water marks, and the sparkling on a high-definition display provided with the transparent layered film; a process for producing the transparent layered film; and an electrode for a touch screen.

Another object of the present invention is to provide a transparent layered film having a low haze, an excellent transparency, and an abrasion resistance; a process for producing the transparent layered film; and an electrode for a touch screen.

Solution to Problem

The inventors of the present invention made intensive studies to achieve the above objects and finally found that the scattering of glass fragments produced by breakage of a glass-containing upper electrode of a touch screen display, the occurrence of water marks, and the sparkling on a high-definition display are preventable by the lamination of an anti-water-mark layer on a first side of a transparent resin layer and the formation of an uneven structure on a surface of the anti-water-mark layer; where the anti-water-mark layer comprises a cured product of a curable composition containing a curable resin, a thermoplastic resin, and a metal oxide particle having an average primary particle size of 1 to 100 nm, and the uneven structure has a roughness average (or an arithmetic average roughness) Ra of not less than 0.005 and less than 0.03 µm, a mean spacing of profile irregularities (or an average spacing of unevenness) Sm of 50 to 300 µm, an average absolute slope (or an arithmetic average inclination) Δa of less than 0.1°, and a ten-point average roughness Rz of less than 0.2. The present invention was accomplished based on the above findings.

That is, an aspect of the present invention provides a transparent layered film comprising a transparent resin layer and an anti-water-mark layer on a first side of the transparent resin layer; the anti-water-mark layer comprises a cured product of a curable composition containing a curable resin, a thermoplastic resin, and a metal oxide particle having an average primary particle size of 1 to 100 nm. The anti-water-mark layer has an uneven surface structure having a roughness average Ra of not less than 0.005 and less than 0.03 µm, a mean spacing of profile irregularities Sm of 50 to 300 µm, an average absolute slope Δa of less than 0.1°, and a ten-point average roughness Rz of less than 0.2 µm. The curable resin may have three or more polymerizable groups, in particular, may contain a first curable resin having four or less polymerizable groups and a second curable resin having five or more polymerizable groups. The thermoplastic resin may comprise a cellulose derivative. The metal oxide particle (or fine particle) may comprise at least one particle selected from the group consisting of an antimony-containing tin oxide, an antimony oxide, a tin oxide, and a zinc oxide. The ratio of the metal oxide particle relative to 100 parts by weight of the curable resin may be about 0.05 to 2.5 parts by weight. The curable composition may further comprise a leveling agent. The transparent layered film of the present invention has a haze of about 0.2 to 1%. The transparent layered film of the present invention may further comprise a low-refraction layer on the anti-water-mark layer. The transparent layered film of the present invention may further comprise an adhesive layer on a second side of the transparent resin layer. The transparent layered film of the present invention may be an anti-shatter film for being disposed inside an upper electrode substrate, containing a glass, of a touch screen display to prevent broken pieces of the glass from scattering.

Another aspect of the present invention provides an upper transparent electrode for a touch screen; the upper transparent electrode comprises a transparent electrode substrate being a laminate of a transparent conductive layer and a glass substrate, and the transparent layered film, wherein the transparent layered film and the transparent electrode substrate are laminated with the adhesive layer of the transparent layered film facing the transparent conductive layer of the transparent electrode substrate. The electrode may be an upper transparent electrode for a capacitive touch screen.

A further aspect of the present invention provides a process for producing the transparent layered film, the process comprising: applying a curable composition to a first side of a transparent resin layer, drying the applied curable composition, and curing the dried composition by actinic ray irradiation.

Advantageous Effects of Invention

According to the present invention, on the first side of the transparent resin layer, the anti-water-mark layer formed of the cured product of the curable composition containing the curable resin, the thermoplastic resin, and the metal oxide particle having an average primary particle size of 1 to 100 nm is layered (or laminated), and the anti-water-mark layer has a specified uneven surface with gently-sloping and short protrusions. This prevents the scattering of glass fragments of a broken upper electrode of a touch screen display and the occurrence of water marks, and the uneven structure, which has a pitch larger than a pixel size of a high-definition display, prevents or reduces the sparkling on a high-definition display. The use of the transparent layered film, which has a low haze and an excellent transparency, for a touch screen display allows a clear image to be visually displayed on the touch screen display. Further, the anti-water-mark layer, which is formed of the specified curable composition, has an improved abrasion resistance.

DESCRIPTION OF EMBODIMENTS

[Anti-Water-Mark Layer]

The transparent layered film of the present invention comprises a transparent resin layer and an anti-water-mark (AWM) layer layered (or laminated) on a first side of the transparent resin layer. The AWM layer comprises a cured product of a curable composition containing a curable resin, a thermoplastic resin, and a metal oxide particle having an average primary particle size of 1 to 100 nm.

[Curable Resin]

As the curable resin (curable monomer or curable resin precursor), there may be used various curable compounds having a reactive functional group to heat or an actinic ray (or active energy ray) (e.g., an ultraviolet ray, and an electron beam) and being capable of forming a resin (particularly a cured or a crosslinked resin) by curing or crosslinking with heat or an actinic ray. For example, as the curable resin, there may be mentioned a thermosetting compound or resin [a low molecular weight compound having an epoxy group, a polymerizable group, an isocyanate group, an alkoxysilyl group, a silanol group, or others (e.g., an epoxy-series resin, an unsaturated polyester-series resin, a urethane-series resin, and a silicone-series resin)], and a photo-curable compound that is curable with an actinic ray (such as ultraviolet ray) (e.g., an ultraviolet-curable compound such as a photo-curable monomer or oligomer). The photo-curable compound may be an EB (electron beam)-curable compound, or others. Incidentally, photo-curable compounds such as a photo-curable monomer, a photo-curable oligomer, and a photo-curable resin which may have a low molecular weight are sometimes simply referred to as "photo-curable resin" collectively.

The photo-curable compound may include, for example, a monomer and an oligomer (or a resin, particularly a resin having a low molecular weight). For example, the monomer can be classified into the following two groups: a monofunctional monomer having one polymerizable group, and a polyfunctional monomer having at least two polymerizable groups.

The monofunctional monomer may include, for example, a (meth)acrylic monomer (e.g., a (meth)acrylate), a vinyl-series monomer (e.g., vinylpyrrolidone), and a (meth)acrylate having a crosslinked cyclic hydrocarbon group (e.g., isobornyl (meth)acrylate and adamantyl (meth)acrylate).

The polyfunctional monomer may include a polyfunctional monomer having about 2 to 8 polymerizable groups. The difunctional monomer may include, for example, an alkylene glycol di(meth)acrylate such as ethylene glycol di(meth)acrylate, propylene glycol di(meth)acrylate, butanediol di(meth)acrylate, neopentyl glycol di(meth)acrylate, or hexanediol di(meth)acrylate; a polyalkylene ether glycol di(meth)acrylate such as diethylene glycol di(meth) acrylate, dipropylene glycol di(meth)acrylate, or a polytetramethylene ether glycol di(meth)acrylate; and a di(meth) acrylate having a crosslinked cyclic hydrocarbon group (e.g., tricyclodecane dimethanol di(meth)acrylate and adamantane di(meth)acrylate).

As the tri- to octa-functional monomer, there may be mentioned, for example, glycerin tri(meth)acrylate, trimethylolpropane tri(meth)acrylate, trimethylolethane tri(meth) acrylate, pentaerythritol tri(meth)acrylate, pentaerythritol tetra(meth)acrylate, dipentaerythritol penta(meth)acrylate, and dipentaerythritol hexa(meth)acrylate.

Examples of the oligomer or resin may include a (meth) acrylate of an adduct of bisphenol A with an alkylene oxide, an epoxy (meth)acrylate (e.g., a bisphenol A-based epoxy (meth)acrylate and a novolak-based epoxy (meth)acrylate), a polyester (meth)acrylate (e.g., an aliphatic polyester-based (meth)acrylate and an aromatic polyester-based (meth)acrylate), a (poly)urethane (meth)acrylate (e.g., a polyester-based urethane (meth)acrylate and a polyether-based urethane (meth)acrylate), a silicone (meth)acrylate, and others. These oligomers or resins may contain a copolymerizable monomer unit as exemplified in the paragraph of the (meth) acrylic resin in the polymer component.

These photo-curable compounds may be used alone or in combination.

Further, the curable resin may contain a fluorine atom or an inorganic particle in order to improve the strength of the AWM layer or other purposes. The fluorine-containing curable compound may include fluorides of the above-mentioned monomer and oligomer, for example, a fluoroalkyl (meth)acrylate [e.g., perfluorooctylethyl (meth)acrylate and trifluoroethyl (meth)acrylate], a fluoro(poly)oxyalkylene glycol di(meth)acrylate [e.g., fluoroethylene glycol di(meth) acrylate and fluoropropylene glycol di(meth)acrylate], a fluorine-containing epoxy resin, and a fluorine-containing urethane-series resin. The curable compound containing an inorganic particle may include, for example, an inorganic particle having a polymerizable group on a surface thereof (e.g., a silica particle which has a surface modified with a silane coupling agent having a polymerizable group). As a nano-sized silica particle (or silica nanoparticle) having a polymerizable group on a surface thereof, for example, a polyfunctional hybrid UV-curing agent (Z7501) is commercially available from JSR Corporation.

The preferred curable resin includes a photo-curable compound curable in a short time, for example, an ultraviolet-curable compound (e.g., a monomer, an oligomer, and a resin which may have a low molecular weight) and an EB-curable compound. In particular, a curable resin having a practical advantage is an ultraviolet-curable resin.

Further, according to the present invention, in order to improve the abrasion resistance of the AWM layer, the curable resin preferably comprises a curable resin having two or more polymerizable groups (preferably about 2 to 10 polymerizable groups, and more preferably about 3 to 8 polymerizable groups), particularly, a polyfunctional (meth) acrylate [for example, a tri- or more-functional (particularly, tetra- to octa-functional) (meth)acrylate (e.g., dipentaerythritol hexa(meth)acrylate)].

Furthermore, according to the present invention, in order to form a specified uneven surface structure on the surface of the AWM layer, it is preferred that a curable resin having four or less polymerizable groups (preferably about 2 to 4 polymerizable groups, and more preferably 3 to 4 polymerizable groups) be used in combination with a curable resin having five or more polymerizable groups (for example, about 5 to 10 polymerizable groups, preferably about 5 to 8 polymerizable groups, and more preferably about 5 to 7 polymerizable groups). In particular, a di- to tetra-functional (meth)acrylate [in particular, a tri- to tetra-functional (meth) acrylate such as pentaerythritol tri(meth)acrylate] may be used in combination with a penta- to octa-functional (meth) acrylate [in particular, a penta- to hepta-functional (meth) acrylate such as dipentaerythritol hexa(meth)acrylate].

The weight ratio of the curable resin having four or less polymerizable groups (for example, a di- to tetra-functional (meth)acrylate) relative to the curable resin having five or more polymerizable groups (for example, a penta- to decafunctional (meth)acrylate) [the former/the latter] is about 99/1 to 1/99, preferably about 90/10 to 10/90, and more preferably about 70/30 to 30/70 (particularly about 60/40 to 40/60). According to the present invention, combination of the curable resins, each different in the number of functional groups, at such a ratio allows a specified uneven structure to be formed on the surface of the AWM layer without damaging of mechanical characteristics.

The molecular weight of the curable resin is, allowing for compatibility to the after-mentioned thermoplastic resin, not more than about 5000 (e.g., about 100 to 5000), preferably not more than about 2000 (e.g., about 200 to 2000), and more preferably not more than about 1000 (e.g., about 300 to 1000). The molecular weight is a weight-average molecular weight determined in terms of polystyrene in a gel permeation chromatography (GPC). For a low-molecular-weight resin, the molecular weight can be calculated from the molecular formula of the resin.

The curable composition may contain a curing agent depending on the variety of the curable resin. For example, a thermosetting resin may contain a curing agent such as an amine or a polyvalent (or polyfunctional) carboxylic acid, and a photo-curable resin may contain a photopolymerization initiator. As the photopolymerization initiator, there may be exemplified a conventional component, e.g., an acetophenone, a propiophenone, a benzyl, a benzoin, a benzophenone, a thioxanthone, an acylphosphine oxide, and others. The amount of the curing agent (such as a photo curing agent) relative to 100 parts by weight of the curable resin is about 0.1 to 20 parts by weight, preferably about 0.5 to 10 parts by weight, and more preferably about 1 to 8 parts by weight (particularly about 1 to 5 parts by weight), and may be about 3 to 8 parts by weight.

Further, the curable resin may contain a curing accelerator. For example, the photo-curable resin may contain a photo-curing accelerator, e.g., a tertiary amine (such as a dialkylaminobenzoic ester) and a phosphine-series photopolymerization accelerator.

[Thermoplastic Resin]

The thermoplastic resin is added to the AWM layer in order to improve the mechanical characteristics such as flexibility (or softness). The thermoplastic resin preferably includes a resin free from a reactive group participating in the curing reaction of the curable resin (in particular, a polymerizable group such as an ethylenic unsaturated bond).

As the thermoplastic resin, for example, there may be exemplified a styrenic resin [e.g., a polystyrene, a copolymer of styrene and a (meth)acrylic monomer, an AS resin, and a styrene-butadiene copolymer], a (meth)acrylic resin [e.g., a poly(meth)acrylate such as a poly(methyl methacrylate), a methyl methacrylate-(meth)acrylic acid copolymer, a methyl methacrylate-(meth)acrylate copolymer, a methyl methacrylate-acrylate-(meth)acrylic acid copolymer, a (meth)acrylate-styrene copolymer (e.g., a MS resin), and a (meth)acrylic acid-methyl (meth)acrylate-isobornyl copolymer], an organic acid vinyl ester-series resin [e.g., an ethylene-vinyl acetate copolymer, a vinyl acetate-vinyl chloride copolymer, a vinyl acetate-(meth)acrylate copolymer, a poly (vinyl alcohol), an ethylene-vinyl alcohol copolymer, and a poly(vinyl acetal) resin], a vinyl ether-series resin [e.g., a poly(vinyl methyl ether), a poly(vinyl ethyl ether), a poly (vinyl propyl ether), and a poly(vinyl t-butyl ether)], a halogen-containing resin [e.g., a poly(vinyl chloride), a poly(vinylidene fluoride), a vinyl chloride-vinyl acetate copolymer, a vinyl chloride-(meth)acrylate copolymer, and a vinylidene chloride-(meth)acrylate copolymer], an olefinic resin [e.g., an olefinic homopolymer such as a polyethylene or a polypropylene, an ethylene-vinyl acetate copolymer, an ethylene-vinyl alcohol copolymer, an ethylene-(meth) acrylic acid copolymer, an ethylene-(meth)acrylate copolymer, and an alicyclic olefinic resin], a polycarbonate-series resin (e.g., a bisphenol A-based polycarbonate), a polyester-series resin [e.g., a poly($C_{2-4}$alkylene arylate) such as a poly(ethylene terephthalate), a poly(butylene terephthalate), or a poly(ethylene naphthalate) and an amorphous polyester such as a poly($C_{2-4}$alkylene arylate)-series copolyester], a polyamide-series resin (e.g., an aliphatic polyamide such as a polyamide 46, a polyamide 6, a polyamide 66, a polyamide 610, a polyamide 612, a polyamide 11, or a polyamide 12), a thermoplastic polyurethane resin (e.g., a polyester-based urethane-series resin), a polysulfone-series resin (e.g., a polyether sulfone and a polysulfone), a polyphenylene ether-series resin (e.g., a polymer of 2,6-xylenol), a cellulose derivative (e.g., a cellulose ester), a silicone resin (e.g., a polydimethylsiloxane and a polymethylphenylsiloxane), a rubber or elastomer (e.g., a diene-series rubber such as a polybutadiene or a polyisoprene, a styrene-butadiene copolymer, an acrylonitrile-butadiene copolymer, an acrylic rubber, a urethane rubber, and a silicone rubber), and the like. These thermoplastic resins may be used alone or in combination.

Among these thermoplastic resins, a widely used one includes a styrenic resin, a (meth)acrylic resin, an alicyclic olefinic resin, a polyester-series resin, a cellulose derivative, or other resins. In view of excellent transparency and heat resistance as well as improved mechanical properties (such as flexibility), the cellulose derivative is preferred.

The cellulose derivative may include a cellulose ester, a cellulose ether, and a cellulose carbamate.

The cellulose ester may include, for example, an aliphatic organic acid ester of a cellulose (e.g., a cellulose $C_{2-6}$acylate such as a cellulose acetate (e.g., a cellulose diacetate and a cellulose triacetate), a cellulose propionate, a cellulose butyrate, a cellulose acetate propionate, or a cellulose acetate butyrate), an aromatic organic acid ester of a cellulose (e.g., a $C_{7-12}$aromatic carboxylic acid ester of a cellulose such as a cellulose phthalate or a cellulose benzoate), and an inorganic acid ester of a cellulose (e.g., a cellulose phosphate and a cellulose sulfate). The cellulose ester may be a mixed acid ester of a cellulose such as a cellulose acetate nitrate.

As the cellulose ether, for example, there may be mentioned a cyanoethylcellulose; a hydroxy $C_{2-4}$alkyl cellulose such as a hydroxyethyl cellulose or hydroxypropyl cellulose; a $C_{1-6}$alkyl cellulose such as a methyl cellulose or an ethyl cellulose; a carboxymethyl cellulose or a salt thereof, a benzyl cellulose, and an acetyl alkyl cellulose.

The cellulose carbamate may include, for example, a cellulose phenylcarbamate.

These cellulose derivatives may be used alone or in combination. Among these cellulose derivatives, a cellulose ester, particularly, a cellulose $C_{2-6}$acylate (e.g., a cellulose diacetate, a cellulose triacetate, a cellulose propionate, a cellulose butyrate, a cellulose acetate propionate, and a cellulose acetate butyrate) is preferred. In particular, a cellulose $C_{2-4}$acylate such as a cellulose diacetate, a cellulose acetate propionate, or a cellulose acetate butyrate (particularly, a cellulose acetate $C_{3-4}$acylate such as a cellulose acetate propionate) is preferred in terms of easy preparation of a coating composition due to a high solubility in a solvent, easy viscosity adjustment of the coating composition by addition in small quantity, inhibition of excess aggregation of fine particles in the coating composition, and improved storage stability.

The ratio of the thermoplastic resin relative to 100 parts by weight of the curable resin is, for example, about 0.1 to 30 parts by weight, preferably about 0.1 to 10 parts by weight (e.g., about 0.3 to 5 parts by weight), and more preferably about 0.5 to 3 parts by weight (particularly, about 0.8 to 2 parts by weight). The ratio of the thermoplastic resin relative to 100 parts by weight of a metal oxide fine particle is, for example, about 100 to 1000 parts by weight, preferably about 150 to 500 parts by weight, and more preferably about 200 to 400 parts by weight. According to the present invention, the balance of the abrasion resistance and the mechanical characteristics (such as shock absorption or cushion property) can be adjusted by adjusting the ratio of the thermoplastic resin. When the ratio of the thermoplastic resin is within the range, the AWM layer has well-balanced abrasion resistance and mechanical properties.

[Metal Oxide Fine Particle]

According to the present invention, addition of a metal oxide fine particle to the AWM layer probably produces convection of the metal oxide fine particle and the resin component to form protrusion of the nucleating metal oxide fine particle, and this forms an appropriate uneven structure which can prevent the occurrence of water marks and the occurrence of sparkling on the surface of the AWM layer. The metal oxide fine particle has excellent transparency and abrasion resistance. In addition, when a low-refraction layer is formed, the metal oxide fine particle achieves improved adhesion of the AWM layer to the low-refraction layer.

The metal oxide constituting the metal oxide fine particle may include, for example, a metal oxide of the Group 4A of the Periodic Table of Elements (e.g., titanium oxide and zirconium oxide), a metal oxide of the Group 5A (e.g., vanadium oxide), a metal oxide of the Group 6A (e.g., molybdenum oxide and tungstic oxide), a metal oxide of the Group 7A (e.g., manganese oxide), a metal oxide of the Group 8 (e.g., nickel oxide and iron oxide), a metal oxide of the Group 1B (e.g., copper oxide), a metal oxide of the Group 2B (e.g., zinc oxide), a metal oxide of the Group 3B (e.g., aluminum oxide and indium oxide), a metal oxide of the Group 4B (e.g., tin oxide), and a metal oxide of the Group 5B (e.g., antimony oxide).

These metal oxide fine particles may be used alone or in combination. Among these metal oxide fine particles, for example, a metal oxide containing antimony, tin, or zinc [e.g., antimony trioxide, antimony tetroxide, antimony pentoxide, antimony tin oxide (antimony-doped tin oxide), tin oxide, and zinc oxide] is preferred. A fine particle comprising at least one member selected from the group consisting of antimony tin oxide, antimony oxide, tin oxide, and zinc oxide [in particular, an antimony-containing tin oxide particle (ATO particle)] is particularly preferred.

The metal oxide fine particle may be in the form of a dispersion dispersed in a solvent. The solvent may include, for example, water, an alcohol (e.g., a lower alcohol such as methanol, ethanol, isopropanol, butanol, or cyclohexanol), a ketone (e.g., acetone, methyl ethyl ketone, methyl isobutyl ketone, and cyclohexanone), an ester (e.g., methyl acetate, ethyl acetate, propyl acetate, butyl acetate, methyl formate, and ethyl formate), an ether (e.g., diethyl ether, dioxane, and tetrahydrofuran), an aliphatic hydrocarbon (e.g., hexane), an alicyclic hydrocarbon (e.g., cyclohexane), an aromatic hydrocarbon (e.g., benzene), a carbon halide (e.g., dichloromethane and dichloroethane), a cellosolve (e.g., methyl cellosolve, and ethyl cellosolve), a cellosolve acetate, and an amide (e.g., dimethylformamide and dimethyhlacetamide). These solvents may be used alone or in combination. Among these solvents, a lower alcohol such as ethanol or isopropanol [for example, a mixed solvent containing ethanol and isopropanol in a weight ratio (ethanol/isopropanol) of about 90/10 to 50/50 (particularly, about 80/20 to 60/40)] is widely used. The concentration of the metal oxide fine particle in the dispersion is, for example, about 0.1 to 50% by weight, preferably about 1 to 40% by weight, and more preferably about 5 to 30% by weight. The metal oxide fine particle may be surface-treated by a conventional surface treatment in order to achieve dispersion in the solvent.

The shape of the metal oxide fine particle is not particularly limited to a specific one. The shape of the fine particle may include a spherical form, an ellipsoidal form, a polygonal form (e.g., a polyangular-pyramid form, a cubic form, and a rectangular-prism form), a plate-like form, a rod-like form, an amorphous form, and others. In order to form a uniform uneven structure on the surface of the AWM layer, an isotropic form (e.g., a substantially spherical form) is preferred.

The average primary particle size (or diameter) of the metal oxide fine particle is, for example, about 1 to 100 nm (e.g., about 1 to 60 nm), preferably about 1.5 to 50 nm (e.g., about 2 to 30 nm), and more preferably about 3 to 15 nm (in particular, about 5 to 10 nm). A metal oxide fine particle having too small a primary particle size tends to make it difficult to form an uneven structure on the surface of the AWM layer. A metal oxide fine particle having too large a primary particle size makes it difficult to form an uneven structure having gently-sloping and short (or low) protrusions on the surface of the AWM layer, and in addition, the height of the uneven structure is larger than a wavelength of light, and this can cause occurrence of sparkling. According to the present invention, a gently uneven structure is formable on a surface of a thin hard coat layer by using a nanometer-sized particle under specified conditions without use of a particle having a large particle size. Further, use of a particle having a large particle size makes it difficult to forma gently uneven structure, while use of a nanoparticle makes it easy form a gently uneven structure.

The ratio of the metal oxide fine particle relative to 100 parts by weight of the curable resin is, for example, about 0.05 to 2.5 parts by weight, preferably about 0.1 to 2 parts by weight, and about more preferably 0.2 to 1.5 parts by weight (particularly about 0.3 to 1.2 parts by weight). An excessively small amount of the fine particle tends to make it difficult to form an uneven structure on the surface of the AWM layer. An excessively large amount of the fine particle makes it difficult to form an uneven structure having gently sloping and short protrusions. The present invention allows formation of the uneven structure which shows AWM characteristics at a low ratio of the fine particle.

[Leveling Agent]

As the leveling agent, there may be used a commonly used leveling agent (e.g., an ethylene oxide adduct of acetylene glycol) as far as the leveling agent has a capability to reduce a surface tension. In light of an excellent capability to reduce a surface tension, the leveling agent may preferably include a silicone-series leveling agent and a fluorine-containing leveling agent. According to the present invention, the combination use of the resin component and the leveling agent can control the shape of the uneven structure of the surface, prevent growth of protrusions with steep sloping angles, and flatten the bottom of each protrusion in the uneven structure to prevent occurrence of sparkling. Not only does the use of a specific leveling agent allow the maintenance of the hardness or abrasion resistance, but the control of the blending ratio also allows the improvement of the hardness or abrasion resistance.

The silicone-series leveling agent includes a leveling agent having a polyorganosiloxane skeleton. As the polyorganosiloxane skeleton, there may be used a polyorganosiloxane having a monofunctional M unit (a unit generally represented by $R_3SiO_{1/2}$), a difunctional D unit (a unit generally represented by $R_2SiO_{2/2}$), a trifunctional T unit (a unit generally represented by $RSiO_{3/2}$), and/or a tetrafunctional Q unit (a unit generally represented by $SiO_{4/2}$). Practically, a polyorganosiloxane having the D unit is used. The polyorganosiloxane may have an organic group (R) selected from hydrocarbon groups such as an alkyl group, an alkenyl group, a cycloalkyl group, a cycloalkenyl group, an aryl group, and an aralkyl group. The organic group R usually includes a $C_{1-4}$alkyl group and/or an aryl group, commonly methyl group and/or phenyl group (in particular, methyl group). The repeating number of siloxane units (the degree of polymerization) is, for example, about 2 to 3000, preferably about 3 to 2000, and preferably about 5 to 1000.

The fluorine-containing leveling agent includes a leveling agent having a fluoroaliphatic hydrocarbon skeleton. As the fluoroaliphatic hydrocarbon skeleton, for example, there may be mentioned a fluoro$C_{1-10}$alkane, such as fluoromethane, fluoroethane, fluoropropane, fluoroisopropane, fluorobutane, fluoroisobutane, fluoro-t-butane, fluoropentane, or fluorohexane.

Each one of these fluoroaliphatic hydrocarbon skeletons has one or more fluorine atoms substituted in place of one or more hydrogen atoms on the parent skeleton. In light of easy control of the surface uneven structure, a perfluoroaliphatic hydrocarbon skeleton in which all hydrogen atoms on the parent skeleton are replaced with fluorine atoms is preferred.

The fluoroaliphatic hydrocarbon skeleton may have a polyfluoroalkylene ether skeleton, which is a repeating unit through an ether bond. The fluoroaliphatic hydrocarbon group as the repeating unit may be at least one member selected from the group consisting of fluoro$C_{1-4}$alkylene groups, for example, fluoromethylene, fluoroethylene, fluoropropylene, and fluoroisopropylene. These fluoroaliphatic hydrocarbon groups may be the same or different from each other. The repeating number of fluoroalkylene ether units (the degree of polymerization) may be, for example, about 10 to 3000, preferably about 30 to 1000, and more preferably about 50 to 500.

Among these skeletons, the polyorganosiloxane skeleton, the polyfluoroalkylene ether skeleton, or other skeletons are preferred in light of excellent capability to reduce a surface tension and easy formation of gently-sloping and short protrusions on the surface of the AWM layer.

In order to impart various functions to the resin composition, the leveling agent having such a skeleton may have a hydrolytically condensable group, a polar group, a radical-polymerizable group, a polyether group, a polyester group, a polyurethane group, or other groups. The silicone-series leveling agent may have a fluoroaliphatic hydrocarbon group, or the fluorine-containing leveling agent may have a polyorganosiloxane group.

The hydrolysable group may include, for example, hydroxysilyl group; a trihalosilyl group (such as trichlorosilyl); a dihalo$C_{1-4}$alkylsilyl group (such as dichloromethylsilyl); a dihaloaryl group (such as dichlorophenylsilyl); a halodi$C_{1-4}$alkylsilyl group (such as chlorodimethylsilyl); a tri$C_{1-4}$alkoxysilyl group (such as trimethoxysilyl or triethoxysilyl); a di$C_{1-4}$alkoxy$C_{1-4}$alkylsilyl group (such as dimethoxymethylsilyl or diethoxymethylsilyl); a di$C_{1-4}$alkoxyarylsilyl group (such as dimethoxyphenylsilyl or diethoxyphenylsilyl); a $C_{1-4}$alkoxydi$C_{1-4}$alkylsilyl group (such as methoxydimethylsilyl or ethoxydimethylsilyl); a $C_{1-4}$alkoxydiarylsilyl group (such as methoxydiphenylsilyl or ethoxydiphenylsilyl); and a $C_{1-4}$alkoxy$C_{1-4}$alkylarylsilyl group (such as methoxymethylphenylsilyl or ethoxymethylphenylsilyl).

The polar group may include, for example, a hydroxyl group, an amino group, a carboxyl group, an acid anhydride group (such as maleic anhydride group), and an isocyanate group.

The radical-polymerizable group may include, for example, a (meth)acryloyloxy group and a vinyl group.

As the polyether group, for example, there may be mentioned a polyoxy $C_{2-4}$alkylene group, such as a polyoxyethylene group, a polyoxypropylene group, a polyoxybutylene group, or a polyoxyethylene-polyoxypropylene group. In the polyether group, the repeating number of oxyalkylene groups (the mole number of oxyalkylene groups added) is, for example, about 2 to 1000, preferably about 3 to 100, and preferably about 5 to 50.

The polyester group may include, for example, a polyester group obtainable by a reaction of a dicarboxylic acid [e.g., an aromatic carboxylic acid (such as terephthalic acid) or an aliphatic carboxylic acid (such as adipic acid)] and a diol (e.g., an aliphatic diol, such as ethylene glycol) and a polyester group obtainable by a ring opening polymerization of a circular ester (e.g., a lactone, such as caprolactone).

The polyurethane group may include, for example, a commonly used polyester-based polyurethane group and a polyether-based polyurethane group.

Each one of these functional groups may be introduced into the polyorganosiloxane skeleton or the fluoroaliphatic hydrocarbon skeleton by a direct bonding or through a linkage group (for example, an alkylene group, a cycloalkylene group, an ether group, an ester group, an amide group, a urethane group, or a linkage group having a plurality of the above-mentioned groups).

Among these functional groups, a preferred one includes a polyether group in respect of an excellent capability to reduce a surface tension, and a polymerizable group in respect that the group is allowed to react with the resin component to improve the hardness of the AWM layer. A particularly preferred functional group includes a group having both polyether group and polymerizable group.

As the silicone-series leveling agent, there may be used a commercially available silicone-series leveling agent. The commercially available silicone-series leveling agent may include, for example, a EBECRYL series leveling agent manufactured by Daicel-Allnex Ltd. (e.g., "EBECRYL1360"), a BYK series leveling agent manufactured by BYK Japan KK (e.g., "BYK-300", "BYK-301/302", "BYK-306", "BYK-307", "BYK-310", "BYK-315", "BYK-313", "BYK-320", "BYK-322", "BYK-323", "BYK-325", "BYK-330", "BYK-331", "BYK-333", "BYK-337", "BYK-341", "BYK-344", "BYK-345/346", "BYK-347", "BYK-348", "BYK-349", "BYK-370", "BYK-375", "BYK-377", "BYK-378", "BYK-UV3500", "BYK-UV3510", "BYK-UV3570", "BYK-3550", "BYK-SILCLEAN3700", and "BYK-SILCLEAN3720"), an AC series leveling agent manufactured by Algin Chemie (e.g., "AC FS180", "AC FS360", and "AC S20"), a POLYFLOW series leveling agent manufactured by Kyoeisha Chemical Co., Ltd. (e.g., "POLYFLOW KL-400X", "POLYFLOW KL-400HF", "POLYFLOWKL-401", "POLYFLOWKL-402", "POLYFLOWKL-403", and "POLYFLOW KL-404"), a KP series leveling agent manufactured by Shin-Etsu Chemical Co., Ltd. (e.g., "KP-323", "KP-326", "KP-341", "KP-104", "KP-110", and "KP-112"), and a leveling agent manufactured by Dow Corning Toray Co., Ltd. (e.g., "LP-7001", "LP-7002", "8032ADDITIVE", "57ADDITIVE", "L-7604", "FZ-2110", "FZ-2105", "67ADDITIVE", "8618ADDITIVE", "3ADDITIVE", and "56ADDITIVE").

As the fluorine-containing leveling agent, there may be used a commercially available fluorine-containing leveling agent. The commercially available fluorine-containing leveling agent may include, for example, a PolyFox series leveling agent manufactured by Kitamura Chemicals Co., Ltd. (e.g., "PF-136A", "PF-156A", "PF-151N", "PF-636", "PF-6320", "PF-656", "PF-6520", "PF-651", and "PF-652"), an OPTOOL series leveling agent manufactured by Daikin Industries, Ltd. ("DSX", "DAC-HP"), a SURFLON series leveling agent manufactured by AGC Seimi Chemical Co., Ltd. (e.g., "S-242", "S-243", "S-420", "S-611", "S-651", and "S-386"), a BYK series leveling agent manufactured by BYK Japan KK (e.g., "BYK-340"), an AC series leveling agent manufactured by Algin Chemie (e.g., "AC 110a" and "AC 100a"), a MEGAFACE series leveling agent manufactured by DIC Corporation (e.g., "MEGAFACE F-114", "MEGAFACE F-410", "MEGAFACE F-444", "MEGAFACE EXP TP-2066", "MEGAFACE F-430", "MEGAFACE F-472SF", "MEGAFACE F-477", "MEGAFACE F-552", "MEGAFACE F-553", "MEGAFACE F-554", "MEGAFACE F-555", "MEGAFACE F-556", "MEGAFACE R-94", "MEGAFACE RS-72-K", "MEGAFACE RS-75", "MEGAFACE F-556", "MEGAFACE EXP TF-1367", "MEGAFACE EXP TF-1437", "MEGAFACE F-558", and "MEGAFACE EXP TF-1537", a FC series leveling agent manufactured by Sumitomo 3M Limited (e.g., "FC-4430" and "FC-4432"), and a FTERGENT series leveling agent manufactured by Neos Company Limited (e.g., "FTERGENT 100", "FTERGENT 100C", "FTERGENT 110", "FTERGENT 150", "FTERGENT 150CH", "FTERGENT A-K", "FTERGENT 501", "FTERGENT 250", "FTERGENT 251", "FTERGENT 222F", "FTERGENT 208G", "FTERGENT 300", "FTERGENT 310", and "FTERGENT 400SW").

These leveling agents may be used alone or in combination. A preferred leveling agent may include a silicone-series leveling agent having a (poly)oxy $C_{2-3}$alkylene group, such as a (poly)oxyethylene group, on a main chain or a side chain of a polyorganosiloxane skeleton thereof (e.g., a polydimethylsiloxanepolyoxyethylene); a silicone-series leveling agent having a (meth)acryloyloxy group on a main chain end or a side chain of a polyorganosiloxane skeleton thereof [e.g., a silicone-modified (meth)acrylic resin having a polyorganosiloxane on a (meth)acrylic resin]; a fluorine-containing leveling agent having a fluoroaliphatic hydrocarbon group on a side chain of a (poly)oxy $C_{2-3}$alkylene skeleton, such as (poly)oxyethylene, thereof (e.g., a fluoroalkylpolyoxyethylene); and a fluorine-containing leveling agent having a fluoroaliphatic hydrocarbon group on a side chain of a (poly)oxy $C_{2-6}$alkylene skeleton such as (poly)oxypropylene, and a (meth)acryloyloxy group on each main chain end.

The ratio of the leveling agent relative to 100 parts by weight of the curable resin can be selected from the range of about 0.001 to 10 parts by weight, and, for example, is about 0.003 to 1 parts by weight, preferably about 0.005 to 0.5 parts by weight, and more preferably about 0.01 to 0.1 parts by weight (particularly about 0.015 to 0.05 parts by weight). The leveling agent in an excessively small ratio fails to show a function of controlling the uneven structure. The leveling agent in an excessively large ratio makes it difficult to form the uneven structure and easily reduces the mechanical characteristics.

(Other Additives)

The AWM layer may contain another fine particle (a second fine particle) as far as an advantage due to the metal oxide fine particle is not deteriorated. The second fine particle may include an organic fine particle and an inorganic fine particle.

Considering the abrasion resistance or others, a fine particle of a crosslinked resin is preferred as the organic fine particle. Examples of the crosslinked resin for the fine particle may include a crosslinked thermoplastic resin [for example, a crosslinked olefinic resin (e.g., a crosslinked polyethylene and a crosslinked polypropylene), a crosslinked styrenic resin (e.g., a crosslinked polystyrene, a crosslinked polydivinylbenzene, a crosslinked polyvinyltoluene, and a crosslinked styrene-methyl methacrylate copolymer), and a crosslinked acrylic resin (e.g., a crosslinked poly(methyl methacrylate))], and a thermosetting resin (for example, a melamine resin, a urea resin, an aminobenzoguanamine resin, a silicone resin, an epoxy resin, and a polyurethane). These organic fine particles may be used alone or in combination.

The inorganic compound for the inorganic fine particle may include an inorganic compound other than a metal oxide, for example, a metal simple substance, a metal sulfate (e.g., calcium sulfate and barium sulfate), a metal silicate (e.g., calcium silicate, aluminum silicate, magnesium silicate, and magnesium aluminosilicate), a metal phosphate (e.g., calcium phosphate and magnesium phosphate), a metal carbonate (e.g., magnesium carbonate, heavy calcium carbonate, and light calcium carbonate), a metal hydroxide (e.g., aluminum hydroxide, calcium hydroxide, and magnesium hydroxide), a silicon compound (e.g., a silica, a white carbon, and a glass), and a natural mineral substance (e.g., a zeolite, a diatomaceous earth, a baked diatomaceous earth, an alumina, a talc, a mica, a kaolin, a sericite, a bentonite, a montmorillonite, a smectite, and a clay).

It is preferred that these fine particles have an average primary particle size of about 1 to 100 nm (in particular, about 1.5 to 50 nm) like the metal oxide fine particle.

The ratio of the second fine particle is, for example, not more than 50 parts by weight, preferably not more than 30 parts by weight (e.g., about 0.01 to 30 parts by weight), and more preferably not more than 10 parts by weight (e.g., about 0.1 to 10 parts by weight) relative to 100 parts by weight of the metal oxide fine particle.

The AWM layer may contain various additives, for example, a stabilizer (e.g., an antioxidant and an ultraviolet absorber), a surfactant, a water-soluble polymer, a filler, a crosslinking agent, a coupling agent, a coloring agent, a flame retardant, a lubricant, a wax, a preservative, a viscosity modifier, a thickener, and a defoaming agent. The proportion of the additive in the AWM layer is about 0.01 to 10% by weight (particularly about 0.1 to 5% by weight).

According to the present invention, for unknown reasons, probably because a small amount of the metal oxide fine particle moderately aggregates and forms a nucleus in the AWM layer without use of a flocculating agent for a fine particle (for example, a flocculating agent described in Japanese Patent Application Laid-Open Publication No. 2009-265143 (JP-2009-265143A)), and the metal oxide fine particle and the uncured resin component gather to agglutinate on the surface of the AWM layer and form protrusions by convective action in a drying step. This can probably form an uneven structure which has AWM characteristics, prevents sparkling, and has gently-sloping and short protrusions. Thus the AWM layer is substantially free from a flocculating agent. It is preferred that the AWM layer have no flocculating agent. Incidentally, it is presumed that the species of the curable resin, the thermoplastic resin, and the solvent, the mixing ratio, and others are also involved in the effects of the present invention.

The AWM layer has, for example, a thickness (average thickness) of about 0.5 to 30 μm, preferably about 1 to 20 μm, and more preferably about 1.5 to 10 μm (particularly about 2 to 5 μm).

[Transparent Resin Layer]

As the transparent resin layer (or substrate layer), there may be used a plastic film or sheet (a non-stretched or stretched plastic film) formed of a transparent resin having a high flexibility and a cracking resistance higher than a glass. As the transparent resin, there may be used the same thermoplastic resin as exemplified in the AWM layer. A preferred transparent resin may include, for example, a cellulose derivative [e.g., a cellulose acetate such as a cellulose triacetate (TAC) or a cellulose diacetate], a polyester-series resin [e.g., a PET, a poly(butylene terephthalate) (PBT), and a polyarylate-series resin], a polysulfone-series resin [e.g., a polysulfone and a polyethersulfone], a polyetherketone-series resin [e.g., a polyetherketone and a polyetheretherketone], a polycarbonate-series resin (e.g., a bisphenol A-based polycarbonate), a polyolefinic resin (e.g., a polyethylene and a polypropylene), a cyclic polyolefinic resin [e.g., TOPAS (registered trademark), ARTON (registered trademark), and ZEONEX (registered trademark)], a halogen-containing resin (e.g., a poly(vinylidene chloride)), a (meth)acrylic resin (e.g., a poly(methyl methacrylate)-series resin), a styrenic resin (e.g., a polystyrene), and a vinyl acetate- or vinyl alcohol-series resin (e.g., a poly(vinyl alcohol)). The plastic film formed of each of these transparent resins may be monoaxially or biaxially stretched.

An optically isotropic transparent plastic film may include, for example, a polyester and a cellulose derivative. In particular, in light of well-balanced heat resistance, transparency, or other characteristics, a film formed of a poly($C_{2-4}$alkylene arylate) such as a PET or a PEN is preferred. Further, the transparent resin layer may be a biaxially stretched film.

The transparent resin layer may contain a commonly used additive (for example, an ultraviolet absorber) as exemplified in the paragraph of the AWM layer. The proportion of the additive in the transparent resin layer is about 0.01 to 10% by weight (particular about 0.1 to 5% by weight).

The transparent resin layer may have a thickness (average thickness) which can be selected from the range of, for example, about 5 to 1000 μm, preferably about 15 to 500 μm, and more preferably about 20 to 300 μm (particularly about 30 to 100 μm).

Adhesive Layer

The transparent layered film of the present invention may further comprise an adhesive layer laminated on a second side of the transparent resin layer. The adhesive layer comprises a transparent binder resin that allows the transparent layered film to adhere to an upper electrode of a touch screen. The transparent binder resin may include, for example, a conventional adhesive resin or cohesive (or sticky) resin.

The adhesive resin may include, for example, a thermoplastic resin (e.g., a polyolefin, a cyclic polyolefin, an acrylic resin, a styrene-series resin, a vinyl acetate-series resin, a polyester, a polyamide, and a thermoplastic polyurethane) and a thermosetting resin (e.g., an epoxy resin, a phenol resin, a polyurethane, an unsaturated polyester, a vinyl ester resin, a diallylphthalate resin, a polyfunctional (meth)acrylate, a urethane (meth)acrylate, a silicone (meth)acrylate, a silicone resin, an amino resin, and a cellulose derivative). These adhesive resins may be used alone or in combination.

The cohesive resin may include, for example, a terpene resin, a rosin-series resin, a petroleum resin, rubber-series agglutinant (or adhesive or pressure sensitive adhesive), a modified polyolefin, an acrylic agglutinant, and a silicone-series agglutinant. These cohesive resins may have a cross-linkable group (e.g., an isocyanate group, a hydroxyl group, a carboxyl group, an amino group, an epoxy group, a methylol group, and an alkoxysilyl group). These cohesive resins may be used alone or in combination.

Among these transparent binder resins, the acrylic agglutinant or the silicone-series agglutinant (in particular, the acrylic agglutinant) is preferred in respect of excellent optical characteristics and easy handling.

The acrylic agglutinant may include, for example, an agglutinant comprising an acrylic copolymer containing a $C_{2-10}$alkyl acrylate (such as ethyl acrylate, butyl acrylate, or 2-ethylhexyl acrylate) as a main component. A copolymerizable monomer for the acrylic copolymer may include, for example, a (meth)acrylic monomer [e.g., (meth)acrylic acid, methyl (meth)acrylate, hydroxyethyl (meth)acrylate, hydroxypropyl (meth)acrylate, dimethylaminoethyl (meth)acrylate, glycidyl (meth)acrylate, (meth)acrylamide, and N-methylolacrylamide], a polymerizable nitrile compound [e.g., (meth)acrylonitrile], an unsaturated dicarboxylic acid or a derivative thereof (e.g., maleic anhydride and itaconic acid), a vinyl ester (e.g., vinyl acetate and vinyl propionate), and an aromatic vinyl compound (e.g., styrene).

As the silicone-series agglutinant, there may be used an agglutinant containing a silicone rubber component and a silicone resin component dissolved in an organic solvent; the silicone rubber component may include, e.g., an MQ resin composed of a monofunctional $R_3SiO_{1/2}$ (wherein R represents an alkyl group (such as methyl group), an aryl group (such as phenyl group), or other groups, the same applies hereinafter) and tetrafunctional $SiO_2$, and the silicone resin component may include, for example, a bifunctional $R_2SiO$ alone, or an oily or gummy component containing a combination of a bifunctional $R_2SiO$ and a monofunctional $R_3SiO_{1/2}$. The silicone rubber component may be cross-linked.

The adhesive layer may contain the conventional additive (for example, an ultraviolet absorber) exemplified in the paragraph of the AWM layer. The proportion of the additive is, for example, about 0.01 to 10% by weight (particularly about 0.1 to 5% by weight) in the adhesive layer.

The adhesive layer has a thickness (average thickness) of, for example, about 1 to 100 μm, preferably about 2 to 80 μm, and more preferably about 3 to 70 μm (particularly about 5 to 50 μm).

[Low-Refraction Layer]

The transparent layered film of the present invention may further have a low-refraction layer formed on the AWM layer in order to decrease the surface reflectance of the AWM layer and increase the transmittance of the light emitted outward. The lamination of the low-refraction layer also allows the improvement of AWM characteristics, although the details of mechanism are unknown.

As the low-refraction layer, a conventional low-refraction layer (for example, a low-refraction layer described in Japanese Patent Application Laid-Open Publication No. 2001-100006 (JP-2001-100006A) and that described in Japanese Patent Application Laid-Open Publication No. 2008-58723 (JP-2008-58723A)) can be used.

The low-refraction layer usually comprises a low-refraction resin (or a resin having a low refraction index). The low-refraction resin may include, for example, a methylpentene resin, a diethylene glycol bis(allyl carbonate) resin, and a fluorocarbon resin such as a poly(vinylidene fluoride) (PVDF) or a poly(vinyl fluoride) (PVF). Moreover, it is preferred that the low-refraction layer contain a fluorine-containing compound. The fluorine-containing compound can desirably reduce the refraction index of the low-refraction layer.

The fluorine-containing compound may include a fluorine-containing resin-precursor which has a fluorine atom and a reactive functional group (e.g., a curable group such as a crosslinkable group or a polymerizable group) by heat or an actinic ray (e.g., an ultraviolet ray or an electron beam) or the like and which can be cured or crosslinked by heat or an actinic ray or the like to form a fluorine-containing resin (particularly a cured or crosslinked resin).

Examples of such a fluorine-containing resin-precursor may include a fluorine atom-containing thermosetting compound or resin [a low molecular weight compound which has a fluorine atom, and a reactive group (e.g., an epoxy group, an isocyanate group, a carboxyl group, and a hydroxyl group), a polymerizable group (e.g., a vinyl group, an allyl group, and a (meth)acryloyl group) or others], a fluorine atom-containing photo-curable compound or resin which is curable by an actinic ray such as an ultraviolet ray (for example, an ultraviolet ray-curable compound such as a photo-curable fluorine-containing monomer or oligomer), and others.

As the thermosetting compound or resin, there may be mentioned, for example, a low molecular weight resin obtainable by using at least a fluorine-containing monomer, e.g., an epoxy-series fluorine-containing resin obtainable by using a fluorine-containing polyol (particularly a diol) instead of part or all of polyol components as a constituting monomer; in the same way, an unsaturated polyester-series fluorine-containing resin obtainable by using a fluorine atom-containing polyol and/or fluorine atom-containing polycarboxylic acid component instead of part or all of polyol and/or polycarboxylic acid component(s); a urethane-series fluorine-containing resin obtainable by using a fluorine atom-containing polyol and/or polyisocyanate component instead of part or all of polyol and/or polyisocyanate component(s); and others. These thermosetting compounds or resins may be used alone or in combination.

The photo-curable compound may include, for example, a monomer, an oligomer (or a resin, in particular a low molecular weight resin). Examples of the monomer may include a fluorine atom-containing monomer corresponding to the monofunctional monomer and polyfunctional monomer exemplified in the paragraph of the AWM layer mentioned above [e.g., a monofunctional monomer such as a fluorine atom-containing (meth)acrylic monomer (such as a fluorinated alkyl ester of (meth)acrylic acid), or a vinyl-series monomer (such as a fluoroolefin); and a di(meth) acrylate of a fluorinated alkylene glycol such as 1-fluoro-1, 2-di(meth)acryloyloxyethylene]. Moreover, a fluorine atom-containing oligomer or resin corresponding to the oligomer or resin exemplified in the paragraph of the AWM layer may be used as the oligomer or resin. These photo-curable compounds may be used alone or in combination.

Further, the low-refraction layer may contain an inorganic filler in order to improve the strength thereof. As the inorganic filler, there may be used, for example, a filler described in the above-mentioned JP-2001-100006A, and others. A filler having a low refraction index (such as a silica or magnesium fluoride), particularly a silica, is preferred. The silica may be a hollow silica as described in Japanese Patent Laid-Open Publication Nos. 2001-233611 (JP-2001-233611A), 2003-192994 (JP-2003-192994A), or others. The hollow silica has not only a great effect of improving transmittance but also an excellent effect of improving AWM characteristics.

The inorganic filler has an average particle size (or particle diameter) of not more than 100 nm, preferably not more than 80 nm (for example, about 10 to 8 nm), and more preferably about 20 to 70 nm.

The proportion of the inorganic filler in the low-refraction layer may for example be not less than 1% by weight and is, for example, about 5 to 90% by weight. Moreover, the surface of the inorganic filler may be modified with a coupling agent (a titanium coupling agent, a silane coupling agent).

The low-refraction layer has a refraction index of, for example, about 1.3 to 1.5 and preferably about 1.35 to 1.45.

The low-refraction layer has a thickness of, for example, about 50 to 1000 nm, preferably about 60 to 500 nm, and more preferably about 70 to 300 nm (particularly about 80 to 200 nm).

[Characteristics of Transparent Layered Film]

The AWM layer in the transparent layered film of the present invention has an uneven structure having gently-sloping and short (mountain-like) projections on a surface thereof, and thus the AWM layer is used as an anti-shatter film for a glass-containing upper electrode substrate of a touch screen display to allow prevention of WM occurrence and prevention of sparkling on a high-definition display such as an LCD or an OLED.

According to the present invention, a specific uneven structure is characterized in that the uneven structure has a relatively small roughness average Ra and short protrusions (recesses and protrusions). The roughness average Ra is not more than 0.005 μm and less than 0.03 μm (e.g., about 0.01 to 0.0295 μm), preferably about 0.012 to 0.029 μm (e.g., about 0.013 to 0.0285 μm), and more preferably about 0.015 to 0.028 μm (particularly about 0.017 to 0.025 μm). For the transparent layered film having the low-refraction layer, or other cases, the roughness average Ra may be about 0.006 to 0.029 μm (particularly about 0.007 to 0.028 μm). An excessively small Ra reduces AWM characteristics. An excessively large Ra easily causes sparkling on a high-definition display.

According to the present invention, the mean spacing of profile irregularities Sm is relatively large. Specifically, the mean spacing of profile irregularities Sm is larger than a pixel size of a high-definition display and allows occurrence of sparkling to be prevented effectively. The mean spacing of profile irregularities Sm is 50 to 300 μm, preferably about 60 to 280 μm (e.g., about 80 to 250 μm), and more preferably about 100 to 200 μm (particularly about 120 to 180 μm). An excessively small Sm is close to a pixel size of a high-definition display and thus can cause interference to result in sparkling. In contrast, an excessively large Sm can reduce AWM characteristics and can also cause sparkling. According to the present invention, making the Sm larger than a pixel size of a display allows effective prevention of occurrence of sparkling.

The present invention is characterized in that the uneven structure, which has gently-sloping protrusions with a small average absolute slope Δa, enables prevention of scattering of the emitted light and effective prevention of occurrence of sparkling. The uneven structure has an average absolute slope Δa of less than 0.1° (e.g., about 0.01 to 0.09°), preferably about 0.021 to 0.085° (e.g., about 0.022 to 0.08°), and more preferably about 0.025 to 0.075° (particularly about 0.03 to 0.07°). In a case where the low-refraction layer is formed, or other cases, the average absolute slope Δa may be about 0.01 to 0.03° (particularly about 0.0105 to 0.02°). An excessively large Δa tends to cause sparkling on a high-definition display. An excessively small Δa can reduce AWM characteristics.

The uneven structure has a ten-point average roughness Rz of less than 0.2 μm (e.g., about 0.022 to 0.195 μm), preferably about 0.025 to 0.18 μm), and more preferably about 0.03 to 0.17 μm (particularly about 0.04 to 0.15 μm). In a case where the low-refraction layer is formed, or other cases, the ten-point average roughness Rz may be about 0.02 to 0.19 μm (particularly about 0.021 to 0.185 μm). An excessively small Rz reduces AWM characteristics. An excessively large Rz tends to cause sparkling on a high-definition display.

According to the present invention, the uneven structure, which has protrusions with a relatively large Sm, relatively large Ra and Rz, and a small sloping angle, has no interference with a pixel of a high-definition display and can prevent sparkling that is easily caused due to steep slope. Furthermore, the uneven structure, which has gently-sloping protrusions formed at moderate intervals, allows prevention of adhesion to a device such as an LCD or an OLED and prevention of occurrence of WM.

According to the present invention, these Ra, Sm, Δa, and Rz can be measured by a method in accordance with Japanese Industrial Standards (JIS) B0601.

The transparent layered film of the present invention has excellent optical characteristics such as transparency and has a total light transmittance at a thickness of 100 μm in accordance with JIS K7361 of, for example, about 70 to 100%, preferably about 80 to 100%, and more preferably about 85 to 99% (particularly, about 90 to 95%).

The transparent layered film of the present invention, which contains a nano-sized metal oxide fine particle and has gently-sloping protrusions (uneven structure), has a low haze, for example a haze at a thickness of 100 μm in accordance with JIS K7136 of about 0.2 to 1%, preferably about 0.25 to 0.8%, and more preferably about 0.3 to 0.6% (particularly about 0.4 to 0.5%). According to the present invention, the transparent layered film having such a low haze allows prevention of sparkling on a high-definition display and improvement of visibility.

The transparent layered film of the present invention has a transmitted image clarity of, for example, about 80 to 100%, preferably about 85 to 99%, and more preferably about 88 to 98% (particularly about 90 to 97%) when an optical slit of 0.5 mm width is used. When the transmitted image clarity is within the above range, the rectilinear transmitted light is less scattered. Thus, even when the transparent layered film is disposed on a high definition display apparatus, scattering from each picture element is reduced and sparkling can be prevented.

The transmitted image clarity is a measure for quantifying defocusing or distortion of a light transmitted through a film. The transmitted image clarity is obtained by measuring a transmitted light from a film through a movable optical slit, and calculating amount of light in both a light part and a dark part of the optical slit. That is, when a transmitted light is defocused by a film, the slit image formed on the optical slit becomes thicker, and as a result the amount of light in the transmitting part is not more than 100%. On the other hand, in the non-transmitting part, the amount of light is not less than 0% due to leakage of light. The value C of the transmitted image clarity is defined by the following formula according to the maximum value M of the transmitted light in the transparent part of the optical slit, and the minimum value m of the transmitted light in the opaque part thereof.

$$C(\%)=[(M-m)/(M+m)]\times 100$$

That is, the closer the value C comes to 100%, the lower the image defocusing depending on the transparent layered film becomes [Reference; Suga and Mitamura, Tosou Gijutsu, July, 1985].

The transparent layered film of the present invention has a low reflectance of not more than 10%, for example, about 0.1 to 8%, preferably about 0.5 to 6%, and more preferably about 1 to 5%.

The transparent layered film of the present invention has AWM characteristics and is thus usable as an anti-shatter film that is disposed inside a glass-containing upper electrode substrate of a touch screen display to prevent broken pieces (or fragments) of the glass from scattering.

[Process for Producing Transparent Layered Film]

The transparent layered film of the present invention can be produced through the steps of applying a curable composition to a first side of a transparent resin layer, drying the applied curable composition, and curing the dried composition by actinic ray irradiation.

In the applying step, the curable composition usually comprises a liquid mixture containing the curable resin, the thermoplastic resin, the metal oxide fine particle, and a solvent (in particular, a liquid composition such as a uniform mixture). In a preferred embodiment, as the liquid mixture, a composition containing the photo-curable resin, the thermoplastic resin, the metal oxide fine particle, the photopolymerization initiator, the solvent in which both the photo-curable resin and the thermoplastic resin are soluble is used.

The solvent may be selected depending on the species and solubility of the curable resin and the thermoplastic resin, and needs only to be a solvent for uniformly dissolving at least solid content (the curable resin, the thermoplastic resin, a reaction initiator, other additive(s)). As such a solvent, there may be mentioned, for example, a ketone (e.g., acetone, methyl ethyl ketone, methyl isobutyl ketone, and cyclohexanone), an ether (e.g., dioxane and tetrahydrofuran), an aliphatic hydrocarbon (e.g., hexane), an alicyclic hydrocarbon (e.g., cyclohexane), an aromatic hydrocarbon (e.g., toluene and xylene), a carbon halide (e.g., dichloromethane and dichloroethane), an ester (e.g., methyl acetate, ethyl acetate, and butyl acetate), water, an alcohol (e.g., ethanol, isopropanol, butanol, cyclohexanol, and 1-methoxy-2-propanol), a cellosolve (e.g., methyl cellosolve, ethyl cellosolve, and propylene glycol monomethyl ether), a cellosolve acetate, a sulfoxide (e.g., dimethylsulfoxide), and an amide (e.g., dimethylformamide and dimethylacetamide). These solvents may be used alone or in combination. The solvent may be a mixed solvent. Among these solvents, a ketone (such as methyl ethyl ketone) or an alcohol (such as butanol or 1-methoxy-2-propanol) is preferred. These solvents (the ketone and the alcohol) may be mixed. For example, the ketone and the alcohol may be mixed in a ratio (weight ratio) of about 90/10 to 10/90, preferably about 80/20 to 20/80, and more preferably about 70/30 to 30/70 as a ratio of the former/the latter. According to the present invention, the degree of aggregation of the metal oxide fine particle may be controlled by appropriately using the solvents in combination.

The concentration of the solute (the curable resin, the thermoplastic resin, the metal oxide fine particle, the reaction initiator, and other additive(s)) in the liquid mixture can be selected within the range not deteriorating castability and coatability, and is, for example, about 1 to 80% by weight, preferably about 5 to 60% by weight, and more preferably about 15 to 40% by weight (particularly about 20 to 40% by weight).

The applying (or coating) method may include a conventional manner, for example, a roll coater, an air knife coater, a blade coater, a rod coater, a reverse coater, a bar coater, a comma coater, a dip and squeeze coater, a die coater, a gravure coater, a microgravure coater, a silkscreen coater, a dipping method, a spraying method, and a spinner method. Among these methods, a bar coater or a gravure coater is used widely. If necessary, the coating composition may be applied a plurality of times.

In the applying step, after the liquid mixture is cast or applied, the solvent is evaporated. The evaporation or removal of the solvent may usually be carried out, for example, at a temperature of about 40 to 150° C., preferably about 50 to 120° C., and more preferably about 60 to 100° C. according to the boiling point of the solvent.

According to the present invention, although the coating composition does not contain a flocculating agent, the nano-sized metal oxide fine particle moderately aggregates in the coating composition and provides a nucleus, and the metal oxide fine particle and the uncured resin component probably gather on the surface of the transparent layered film to form protrusions by a convective action due to evaporation of the solvent.

In the curing step, the applied curable composition is finally cured with an actinic ray (e.g., an ultraviolet ray, an electron beam), heat, or other means to form an AWM layer. The curing of the curable resin may be carried out by combining heating, light irradiation, or other means, depending on the species of the curable resin.

The heating temperature may be selected from an appropriate range, for example, about 50 to 150° C. The light irradiation may be selected depending on the species of a photo-curable component or others. An ultraviolet ray, an electron beam, and others may usually be used.

For the ultraviolet ray, the light source may include, for example, a Deep UV lamp, a low-pressure mercury lamp, a high-pressure mercury lamp, a superhigh-pressure mercury lamp, a halogen lamp, and a laser light source (a light source, such as a helium-cadmium laser or an excimer laser). The quantity of the irradiation light (irradiation energy) varies depending on the thickness of the coating and may be selected from the range of about 10 to 10000 mJ/cm$^2$ (e.g., about 50 to 1000 mJ/cm$^2$), and may for example be about 10 to 5000 mJ/cm$^2$, preferably about 30 to 3000 mJ/cm$^2$, and more preferably about 50 to 1000 mJ/cm$^2$.

If necessary, the light irradiation may be carried out under an inactive gas atmosphere. In particular, photo curing of the curable resin not only allows immediate immobilization (or fixation) but also inhibits deposition of a low molecular weight component (such as an oligomer) from the inside of the transparent resin layer due to heat. Further, the curing of the curable resin can impart an abrasion resistance to the AWM layer.

For the formation of the low-refraction layer on the AWM layer, the low-refraction layer may be formed by applying or casting a coating composition and then curing the coated layer with heat, an actinic ray, or other means, usually in the same manner as in the AWM layer.

According to the present invention, in order to improve the adhesion of other layer(s) (for example, a low-refraction layer or a transparent conductive layer) to the AWM layer, the AWM layer may be subjected to a surface treatment. The surface treatment may include a conventional surface treatment, for example, a corona discharge treatment, a flame treatment, a plasma treatment, and an ozone or ultraviolet irradiation treatment.

[Transparent Electrode for Touch Screen]

The transparent electrode of the present invention comprises a glass-containing transparent electrode substrate (or a transparent electrode substrate containing a glass) and the transparent layered film. For example, the electrode may be an upper transparent electrode for being disposed at a viewing side of a resistive or capacitive touch screen.

The upper transparent electrode for a touch screen comprises a transparent electrode substrate and the transparent layered film, and the transparent electrode substrate is a laminate of a transparent conductive layer and a glass substrate. The transparent layered film and the transparent electrode substrate may be laminated with the adhesive layer of the transparent layered film facing the transparent conductive layer of the transparent electrode substrate.

As the glass substrate, there may be used, for example, a substrate formed of a glass such as a soda glass, a borosilicate glass, a crown glass, a barium-containing glass, a strontium-containing glass, a boron-containing glass, a low-alkali glass, a no-alkali glass, a crystallized transparent glass, a silica glass, a quartz glass, or a heat-resistant glass. The glass substrate may have a thickness (average thickness) of, for example, about 50 to 3000 μm, preferably about 100 to 2000 μm, and more preferably about 200 to 1500 μm.

The transparent conductive layer may comprise, for example, a layer containing a metal oxide [e.g., an indium oxide-tin oxide-series compound oxide (ITO), a fluorine-doped tin oxide (FTO), $InO_2$, $SnO_2$, and ZnO] or a metal (e.g., gold, silver, platinum, and palladium) (in particular, a metal oxide layer such as an ITO membrane). Such a transparent conductive layer can be formed by a conventional method, for example, sputtering, deposition, chemical vapor deposition, and other means (usually sputtering). The transparent conductive layer has a thickness (average thickness) of, for example, about 0.01 to 0.05 μm, preferably about 0.015 to 0.03 μm, and more preferably about 0.015 to 0.025 μm.

According to the type of the touch screen, the transparent conductive layer which is formed on the glass substrate has usually a uniform plane for an analog system and a striped pattern for a digital system. A method for forming the transparent conductive layer having a uniform plane or a striped pattern may include, for example, a method which comprises forming a transparent conductive layer on the whole surface of the glass substrate and then etching the transparent conductive layer to a uniform plane or a striped pattern, and a method which comprises forming a transparent conductive layer having a predetermined pattern on the glass substrate.

The transparent electrode of the present invention may further comprise other optical elements [for example, various optical elements to be disposed into a light path, e.g., a polarizing plate, an optical retardation plate (or a phase plate), and a light guide plate (or light guide)] in combination.

The transparent electrode of the present invention can be used for either resistive or capacitive touch screen display. The transparent electrode also prevents sparkling on a high-definition display and is thus particularly suitable for the capacitive touch screen display, in which a device provided with a high-definition LCD or OLED is now in widespread use.

EXAMPLES

The following examples are intended to describe this invention in further detail and should by no means be interpreted as defining the scope of the invention. Transparent layered films obtained in Examples and Comparative Examples were evaluated for the following items.

[Abrasion Resistance of AWM Layer]

A #0000 steel wool was allowed to go back and forth on a surface of an AWM layer ten times at a weighting of 9.5 N/cm$^2$. Then the number of abrasions on the hard coat layer was counted, and the abrasion resistance was evaluated based on the following criteria.

"A": The number of abrasions is 0.
"B": The number of abrasions is 1 to 3.
"C": The number of abrasions is 4 to 6.
"D": The number of abrasions is not less than 7.

[Abrasion Resistance of Low-Refraction Layer]

A #0000 steel wool was allowed to go back and forth on a surface of a low-refraction layer ten times at a weighting of 2.45 N/cm$^2$. Then the number of abrasions on the low-refraction layer was counted, and the abrasion resistance was evaluated based on the following criteria.

"A": The number of abrasions is 0 to 3.
"B": The number of abrasions is 4 to 6.
"C": The number of abrasions is 7 to 9.
"D": The number of abrasions is not less than 10.

[Pencil Hardness]

The pencil hardness was measured by applying a load of 7.4 N in accordance with JIS K5400.

[Total Light Transmittance and Haze]

Using a haze meter ("NDH-5000W" manufactured by Nippon Denshoku Industries Co., Ltd.), the total light transmittance was measured in accordance with JIS K7361 and the haze was measured in accordance with JIS K7136.

[Reflectance]

A black film was pasted on a transparent resin layer of a transparent layered film, and the integrated reflectance (in terms of luminosity factor) was measured by an integrating sphere reflection intensity measuring apparatus ("U-3300" manufactured by Hitachi High-Technologies Corporation).

[Transmitted Image (Image) Clarity]

The image clarity of an optical film was measured in accordance with JIS K7105 by using an image clarity measuring apparatus ("ICM-1T" manufactured by Suga Test Instruments Co., Ltd.), where the film was installed so that the machine direction of the film would be parallel to the teeth direction of an optical slit. The image clarity was measured by using the image clarity measuring apparatus provided with an optical slit (the slit width=0.5 mm).

[Roughness Average Ra, Mean Spacing of Profile Irregularities Sm, Average Absolute Slope Δa, Ten-Point Average Roughness Rz]

The roughness average Ra, the mean spacing of profile irregularities Sm, the average absolute slope Δa, and the ten-point average roughness Rz were measured in accordance with JIS B0601 by using a non-contact surface texture measuring instrument ["VertScan 2.0" manufactured by Ryoka Systems Inc.].

[Evaluation of Sparkling]

The transparent layered film obtained was pasted on a transparent glass board having a thickness of 3 mm, and the resulting laminate was placed on a 5-inch LCD monitor (pixel size: 1920×1080, resolution: 440 ppi) so that the transparent layered film faced the monitor. A green image was displayed on the screen of the monitor, and the sparkling on the display visually observed from the front of the monitor was evaluated on the basis of the following criteria.

"A": No sparkling is recognized.
"B": Sparkling is slightly recognized.
"C": Sparkling is recognized.
"D": Strong sparkling is recognized.

[Anti-Water-Mark (AWM) Characteristics]

The AWM characteristics were evaluated according to the following procedure.

1. For each of the transparent layered films obtained in Examples, a 0.7-mm transparent glass was pasted on a side not having the AWM layer of the transparent layered film through a pressure sensitive adhesive layer having a thickness of 25 μm.

2. The transparent layered film was laminated on a 10-inch polarizing plate provided with 0.2-mm gap at a width of 1 cm on a periphery thereof so that the AWM layer faced the polarizing plate.

3. The central part of the transparent glass was pressed for 10 seconds at a load of 20 N/cm$^2$ and then released. Ten (10) seconds after the release, the state was evaluated on the basis of the following criteria.

"A": The transparent layered film does not adhere to the polarizing plate.
"B": The transparent layered film adheres to the polarizing plate in a slight portion.
"C": The transparent layered film adheres to the polarizing plate in the whole portion.

[Preparation of Coating Composition]

(Coating composition for Anti-Water-Mark Layer: AWM-1)

In a mixed solvent containing 145 parts by weight of methyl ethyl ketone (MEK), 72 parts by weight of 1-methoxy-2-propanol (MMPG), and 25 parts by weight of 1-butanol (BuOH), 50 parts by weight of dipentaerythritol hexaacrylate ("DPHA" manufactured by Daicel-Allnex Ltd.), 50 parts by weight of pentaerythritol triacrylate ("PE-TRA" manufactured by Daicel-Allnex Ltd.), and 1.2 parts by weight of a cellulose acetate propionate ("CAP" manufactured by Eastman, Ltd.) were dissolved. To this solution, 2 parts by weight of a photopolymerization initiator ("IR-GACURE 184" manufactured by BASF Japan Ltd.) and 1 part by weight of a photopolymerization initiator ("IRGA-CURE 907" manufactured by BASF Japan Ltd.) were added and dissolved. Further, 2 parts by weight of an ATO particle ["ELCOM SH-1212ATV" manufactured by JGC Catalysts and Chemicals Ltd., particle size: 8 nm, a dispersion in 20% by weight of a mixed alcohol solvent (ethanol/isopropanol=80/20 (weight ratio))] was added to the resulting solution, and the mixture was stirred for one hour to prepare a coating composition for AWM layer: AWM-1.

(Coating Composition for Anti-Water-Mark Layer: AWM-2)

A coating composition AWM-2 for anti-water-mark layer was prepared in the same manner as in the AWM-1 except that 4 parts by weight of a tin oxide (SnO$_2$) particle (manufactured by CIK NanoTek Corporation, particle size:

19 nm, a dispersion in 10% by weight of methyl isobutyl ketone) was used instead of the ATO particle.

(Coating Composition for Anti-Water-Mark Layer: AWM-3)

A coating composition AWM-3 for anti-water-mark layer was prepared in the same manner as in the AWM-1 except that 4 parts by weight of a zinc oxide (ZnO) particle (manufactured by CIK NanoTek Corporation, particle size: 52 nm, a dispersion in 10% by weight of MMPG) was used instead of the ATO particle.

(Coating Composition for Anti-Water-Mark Layer: AWM-4)

A coating composition AWM-4 for anti-water-mark layer was prepared in the same manner as in the AWM-1 except that the amount of the ATO particle was changed to 1.5 parts by weight.

(Coating Composition for Anti-Water-Mark Layer: AWM-5)

A coating composition AWM-5 for anti-water-mark layer was prepared in the same manner as in the AWM-1 except that the amount of the ATO particle was changed to 3 parts by weight.

(Coating Composition for Anti-Water-Mark Layer: AWM-6)

A coating composition AWM-6 for anti-water-mark layer was prepared in the same manner as in the AWM-1 except that the amount of the ATO particle was changed to 6 parts by weight.

(Coating Composition for Anti-Water-Mark Layer: AWM-7)

A coating composition AWM-7 for anti-water-mark layer was prepared in the same manner as in the AWM-4 except that 0.0175 parts by weight of a leveling agent ("PolyFox 3320" manufactured by KITAMURA CHEMICALS CO., LTD.) was added.

(Coating Composition for Anti-Water-Mark Layer: AWM-8)

A coating composition AWM-8 for anti-water-mark layer was prepared in the same manner as in the AWM-5 except that 0.0175 parts by weight of a leveling agent ("PolyFox 3320" manufactured by KITAMURA CHEMICALS CO., LTD.) was added.

(Coating Composition for Anti-Water-Mark Layer: AWM-9)

A coating composition AWM-9 for anti-water-mark layer was prepared in the same manner as in the AWM-6 except that 0.0175 parts by weight of a leveling agent ("PolyFox 3320" manufactured by KITAMURA CHEMICALS CO., LTD.) was added.

Coating Composition for Anti-Water-Mark Layer: AWM-10)

A coating composition AWM-10 for anti-water-mark layer was prepared in the same manner as in the AWM-1 except that the amount of the ATO particle was changed to 0.05 parts by weight.

(Coating Composition for Anti-Water-Mark Layer: AWM-11)

A coating composition AWM-11 for anti-water-mark layer was prepared in the same manner as in the AWM-1 except that the amount of the ATO particle was changed to 15 parts by weight.

(Coating Composition for Anti-Water-Mark Layer: AWM-12)

A coating composition AWM-12 for anti-water-mark layer was prepared in the same manner as in the AWM-7 except that the amount of the ATO particle was changed to 0.05 parts by weight.

(Coating Composition for Anti-Water-Mark Layer: AWM-13)

A coating composition AWM-13 for anti-water-mark layer was prepared in the same manner as in the AWM-7 except that the amount of the ATO particle was changed to 15 parts by weight.

(Coating Composition for Low-Refraction Layer: LC)

A commercially available dispersion containing a hollow silica fine particle ("ELCOM P-5063" manufactured by JGC Catalysts and Chemicals Ltd., solid content: 3% by weight) was used.

Example 1

As a transparent resin layer, a PET film (PET manufactured by Mitsubishi Plastics, Inc., thickness: 75 μm) was used. The coating composition AWM-1 for AWM layer was applied on the film with the use of a bar coater #10 and then dried at 80° C. for one minute. The coated film passed through an ultraviolet irradiation equipment (manufactured by Ushio Inc., a high-pressure mercury lamp, dose of ultraviolet ray; 100 mJ/cm$^2$) for ultraviolet curing treatment to form an AWM layer having an uneven surface structure. The thickness of the AWM layer in the resulting transparent layered film was about 3 μm.

Examples 2 to 9 and Comparative Examples 1 to 4

For each example, a transparent layered film was obtained in the same manner as in Example 1 except that each of AWM-2 to 13 was used instead of AWM-1 as the coating composition for AWM layer.

Table 1 shows evaluation results of the transparent layered films obtained in Examples 1 to 9 and Comparative Examples 1 to 4.

TABLE 1

| | Examples | | | | | | |
|---|---|---|---|---|---|---|---|
| | 1 | 2 | 3 | 4 | 5 | 6 | 7 |
| Coating composition for AWM layer | AWM-1 | AWM-2 | AWM-3 | AWM-4 | AWM-5 | AWM-6 | AWM-7 |
| Coating composition for low-refraction layer | — | — | — | — | — | — | — |
| Fine particle | ATO | SnO$_2$ | ZnO | ATO | ATO | ATO | ATO |
| Fine particle/monomer ratio | 0.4 | 0.4 | 0.4 | 0.3 | 0.6 | 1.2 | 0.3 |
| Leveling agent (parts) | — | — | — | — | — | — | 0.0175 |
| Abrasion resistance 9.8 N/cm$^2$ (Evaluation/numbers of abrasions) | A/0 | A/0 | A/0 | A/0 | A/0 | A/0 | A/0 |

TABLE 1-continued

|  |  |  |  |  |  |  |  |
|---|---|---|---|---|---|---|---|
| Abrasion resistance 2.45 N/cm² (Evaluation/numbers of abrasions) | — | — | — | — | — | — | — |
| Pencil hardness | 2H | 2H | 2H | 2H | 2H | 2H | 2H |
| Total light transmittance (%) | 91.0 | 90.9 | 91.0 | 91.1 | 90.8 | 90.9 | 90.9 |
| Haze (%) | 0.47 | 0.49 | 0.44 | 0.49 | 0.48 | 0.42 | 0.49 |
| Reflectance (%) | 4.5 | 4.4 | 4.4 | 4.4 | 4.4 | 4.4 | 4.4 |
| Transmitted image clarity (%) | 95.4 | 95.3 | 95.6 | 95.8 | 93.4 | 91.9 | 96.1 |
| Ra (µm) | 0.0130 | 0.0154 | 0.0121 | 0.0110 | 0.0185 | 0.0295 | 0.0065 |
| Sm (µm) | 145 | 128 | 150 | 185 | 172 | 125 | 189 |
| Δa (°) | 0.0222 | 0.0219 | 0.0289 | 0.0201 | 0.0489 | 0.0881 | 0.0121 |
| Rz (µm) | 0.0457 | 0.0389 | 0.0406 | 0.0401 | 0.0755 | 0.1921 | 0.0333 |
| Sparkling | A | A | A | A | A | A | A |
| AWM characteristics | A | A | A | B | A | A | B |

|  | Examples | | Comparative Examples | | | |
|---|---|---|---|---|---|---|
|  | 8 | 9 | 1 | 2 | 3 | 4 |
| Coating composition for AWM layer | AWM-8 | AWM-9 | AWM-10 | AWM-11 | AWM-12 | AWM-13 |
| Coating composition for low-refraction layer | — | — | — | — | — | — |
| Fine particle | ATO | ATO | ATO | ATO | ATO | ATO |
| Fine particle/monomer ratio | 0.6 | 1.2 | 0.01 | 3 | 0.01 | 3 |
| Leveling agent (parts) | 0.0175 | 0.0175 | — | — | 0.0175 | 0.0175 |
| Abrasion resistance 9.8 N/cm² (Evaluation/numbers of abrasions) | A/0 | A/0 | A/0 | A/0 | A/0 | A/0 |
| Abrasion resistance 2.45 N/cm² (Evaluation/numbers of abrasions) | — | — | — | — | — | — |
| Pencil hardness | 2H | 2H | 2H | 2H | 2H | 2H |
| Total light transmittance (%) | 91.1 | 90.7 | 91.1 | 91.1 | 90.8 | 90.9 |
| Haze (%) | 0.48 | 0.42 | 0.43 | 0.57 | 0.42 | 0.59 |
| Reflectance (%) | 4.4 | 4.4 | 4.4 | 4.4 | 4.4 | 4.4 |
| Transmitted image clarity (%) | 95.1 | 93.1 | 96.4 | 38.5 | 96.4 | 54.0 |
| Ra (µm) | 0.0108 | 0.0210 | 0.0017 | 0.1782 | 0.0015 | 0.1587 |
| Sm (µm) | 168 | 122 | 190 | 151 | 195 | 147 |
| Δa (°) | 0.0390 | 0.0612 | 0.0087 | 0.1327 | 0.0074 | 0.1125 |
| Rz (µm) | 0.0711 | 0.1689 | 0.0210 | 0.3892 | 0.0192 | 0.3452 |
| Sparkling | A | A | A | D | A | D |
| AWM characteristics | A | A | C | A | C | A |

Example 10

The coating composition LC for low-refraction layer was applied on the AWM layer of the transparent layered film obtained in Example 4 with the use of a bar coater #4 and dried at 70° C. for one minute. Thereafter, the coated film passed through an ultraviolet irradiation equipment (manufactured by Ushio Inc., a high-pressure mercury lamp, dose of ultraviolet ray; 100 mJ/cm²) for ultraviolet curing treatment to form a low-refraction layer. The thickness of the low-refraction layer in the resulting transparent layered film was about 100 nm.

Examples 11 to 15 and Comparative Examples 5 to 8

For each example, a transparent layered film was obtained in the same manner as in Example 10 except that each of transparent layered films obtained in Examples 5 to 9 and Comparative Examples 1 to 4 was used instead of the transparent layered film obtained in Example 4.

Table 2 shows evaluation results of the transparent layered films obtained in Examples 10 to 15 and Comparative Examples 5 to 8.

TABLE 2

|  | Examples | | | | | | Comparative Examples | | | |
|---|---|---|---|---|---|---|---|---|---|---|
|  | 10 | 11 | 12 | 13 | 14 | 15 | 5 | 6 | 7 | 8 |
| Coating composition for AWM layer | AWM-4 | AWM-5 | AWM-6 | AWM-7 | AWM-8 | AWM-9 | AWM-10 | AWM-11 | AWM-12 | AWM-13 |
| Coating composition for low-refraction layer | LC | LC | LC | LC | LC | LC | LC | LC | LC | LC |
| Fine particle | ATO | ATO | ATO | ATO | ATO | ATO | ATO | ATO | ATO | ATO |
| Fine particle/monomer ratio | 0.3 | 0.6 | 1.2 | 0.3 | 0.6 | 1.2 | 0.01 | 3 | 0.01 | 3 |
| Leveling agent (parts) | — | — | — | 0.0175 | 0.0175 | 0.0175 | — | — | 0.0175 | 0.0175 |

TABLE 2-continued

| | | | | | | | | | | |
|---|---|---|---|---|---|---|---|---|---|---|
| Abrasion resistance 9.8 N/cm² (Evaluation/numbers of abrasions) | — | — | — | — | — | — | — | — | — | — |
| Abrasion resistance 2.45 N/cm² (Evaluation/numbers of abrasions) | A/0 | A/0 | A/0 | A/0 | A/0 | A/0 | A/0 | A/0 | A/0 | A/0 |
| Pencil hardness | 2H | 2H | 2H | 2H | 2H | 2H | 2H | 2H | 2H | 2H |
| Total light transmittance (%) | 94.1 | 94.0 | 94.1 | 94.2 | 94.1 | 94.0 | 94.0 | 94.2 | 94.1 | 94.1 |
| Haze (%) | 0.44 | 0.47 | 0.43 | 0.47 | 0.49 | 0.45 | 0.44 | 0.58 | 0.42 | 0.55 |
| Reflectance (%) | 1.2 | 1.2 | 1.2 | 1.2 | 1.2 | 1.2 | 1.2 | 1.2 | 1.2 | 1.2 |
| Transmitted image clarity (%) | 95.5 | 93.7 | 92.1 | 96.1 | 95.2 | 93.4 | 96.4 | 39.0 | 96.4 | 55.0 |
| Ra (μm) | 0.0105 | 0.0177 | 0.0282 | 0.0068 | 0.0115 | 0.0199 | 0.0016 | 0.1752 | 0.0015 | 0.1551 |
| Sm (μm) | 185 | 177 | 135 | 173 | 170 | 130 | 184 | 189 | 171 | 183 |
| Δa (°) | 0.0189 | 0.0444 | 0.0839 | 0.0108 | 0.0312 | 0.0542 | 0.0086 | 0.1279 | 0.0074 | 0.1111 |
| Rz (μm) | 0.0360 | 0.0712 | 0.1835 | 0.0250 | 0.0679 | 0.1496 | 0.0199 | 0.3795 | 0.0188 | 0.3396 |
| Sparkling | A | A | A | A | A | A | A | D | A | D |
| AWM characteristics | B | A | A | A | A | A | C | A | C | A |

In Tables 1 and 2, the term "Fine particle/monomer ratio" means a weight ratio (parts by weight) (in terms of solid content) of the fine particle relative to 100 parts by weight of the total of the curable monomers.

As apparent from the results shown in Tables 1 and 2, the transparent layered films obtained in Examples have excellent abrasion resistance and optical characteristics, and in addition, prevent sparkling on a high-definition display and have AWM characteristics. In contrast, the transparent layered films obtained in Comparative Examples fail to achieve well-balanced combination of sparkling prevention and AWM characteristics.

INDUSTRIAL APPLICABILITY

The transparent layered film of the present invention is usable as a film which prevents or reduces scattering of glass fragments produced by breakage of a touch screen display having a glass-containing upper transparent electrode. The transparent layered film is usable for a touch screen display having a touch screen (such as a resistive touch screen or a capacitive touch screen) in combination with a display (e.g., an LCD, a plasma display, and an organic or inorganic EL display) in a display unit of an electric or electronic equipment or precision equipment, such as a PC, a television, a mobile phone or a smartphone, an electronic paper, a game console, a mobile device, a clock or a watch, or an electronic calculator. In particular, the transparent layered film, which has an excellent visibility, is useful as an anti-shatter film for an upper transparent electrode of a projected capacitive touch screen of ITO grid system, such as a PC, a 4K television, a smartphone, a tablet PC, a pen tablet, or a game console (for example, a touch screen for a high-definition display such as an LCD or an OLED).

The invention claimed is:
1. A transparent layered film comprising:
a transparent resin layer and an anti-water-mark layer on a first side of the transparent resin layer, the anti-water-mark layer comprising a cured product of a curable composition containing a curable resin, a thermoplastic resin, and a metal oxide particle having an average primary particle size of 1 to 100 nm,
wherein the anti-water-mark layer has an uneven surface structure having a roughness average Ra of not more than 0.005 and less than 0.03 μm, a mean spacing of profile irregularities Sm of 50 to 300 μm, an average absolute slope Δa of less than 0.1°, and a ten-point average roughness Rz of less than 0.2 μm.

2. The transparent layered film according to claim 1, wherein the curable resin has three or more polymerizable groups.

3. The transparent layered film according to claim 1, wherein the curable resin comprises a first curable resin having four or less polymerizable groups and a second curable resin having five or more polymerizable groups.

4. The transparent layered film according to claim 1, wherein the thermoplastic resin comprises a cellulose derivative, the metal oxide particle comprises at least one particle selected from the group consisting of an antimony-containing tin oxide, an antimony oxide, a tin oxide, and a zinc oxide.

5. The transparent layered film according to claim 1, wherein a ratio of the metal oxide particle is 0.05 to 2 parts by weight relative to 100 parts by weight of the curable resin.

6. The transparent layered film according to claim 1, wherein the curable composition further comprises a leveling agent.

7. The transparent layered film according to claim 1, which has a haze of 0.2 to 1%.

8. The transparent layered film according to claim 1, which further comprises a low-refraction layer on the anti-water-mark layer.

9. The transparent layered film according to claim 1, which further comprises an adhesive layer on a second side of the transparent resin layer.

10. The transparent layered film according to claim 1, which is an anti-shatter film for being disposed inside an upper electrode substrate of a touch screen display to prevent broken pieces of a glass from scattering, wherein the substrate contains the glass.

11. An upper transparent electrode for a touch screen, the upper transparent electrode comprising:
a transparent electrode substrate being a laminate of a transparent conductive layer and a glass substrate and
a transparent layered film recited in claim 9,
wherein the transparent layered film and the transparent electrode substrate are laminated with the adhesive layer of the transparent layered film facing the transparent conductive layer of the transparent electrode substrate.

12. The upper transparent electrode for a touch screen according to claim 11, which is an upper transparent electrode for a capacitive touch screen.

* * * * *